United States Patent [19]

Lehnen

[11] 4,209,273
[45] Jun. 24, 1980

[54] MACHINE TOOL SPEED CONTROL SYSTEM

[76] Inventor: Peter E. Lehnen, 2084 Cheryl Ct., Melbourne, Fla. 32935

[21] Appl. No.: 869,468

[22] Filed: Jan. 16, 1978

[51] Int. Cl.² .................. B23B 39/00; B23B 47/02
[52] U.S. Cl. .................................. 408/9; 408/128; 29/568; 340/147 R
[58] Field of Search .............. 408/9, 3, 4, 31, 35, 408/128; 279/1 TS; 29/568; 340/147 R

[56] References Cited

U.S. PATENT DOCUMENTS

| 3,259,023 | 7/1966 | Rieger et al. | 408/9 X |
| 3,273,023 | 9/1966 | Meyer | 340/147 R |

FOREIGN PATENT DOCUMENTS

758135  9/1956  United Kingdom ............... 29/568

Primary Examiner—Leonidas Vlachos
Attorney, Agent, or Firm—Richard D. Dixon

[57] ABSTRACT

This invention relates to a retrofit system for automatically selecting and continuously controlling the rotational speed of a typical machine tool. A plurality of sensors are provided adjacent to the storage receptacles for each of the tools or tool holders. When a tool is removed from the storage location, a pre-set speed reference signal is generated responsive thereto for controlling the rotational speed of the machine tool. A rotational speed sensor may also be included for continuously correcting the rotational speed of the machine tool for speed variations due to loading, voltage variations, etc.

4 Claims, 7 Drawing Figures

MACHINE TOOL SPEED CONTROL SYSTEM

BACKGROUND OF THE INVENTION

I. FIELD OF THE INVENTION

The present invention relates to an automatic speed control system for use with variable speed machine tools such as vertical mills, drill presses, and similar tools which employ quick change tool holders. The system is especially well suited for retrofit coupling to variable speed machine tools of the type which employ mechanically biased, variable ratio belt and pulley drive systems.

II. DESCRIPTION OF THE PRIOR ART

The design of modern vertical milling machines, such as those manufactured by Bridgeport Machine Company, require that the machine operator manually select the spindle drive speed after referencing separate charts or the operator's memory. This speed selection is accomplished by the operator selecting the desired tool from among those available from a tool storage area. The operator then inserts the tool together with its quick change holder into the spindle or chuck which is used to rotate the tool. The actual speed change function is accomplished by having the operator mechanically rotate a crank which turns a worm gear which in turn drives a shaft having a flexible chain coupled thereto. This chain pulls a lever which compresses the opposing effective surfaces of a slave pulley, thereby causing the pulley to assume a larger effective diameter. This slave pulley is coupled by a flexible belt to a drive pulley which is driven by an electromechanical motor. Since the drive pulley includes a mechanically biased pulley wheel of variable diameter, the increase in the effective diameter of the slave pulley causes a corresponding decrease in the effective diameter of the drive pulley, thereby continuously varying the effective drive speed of the spindle. The effective drive speed of the spindle is selected by the operator from a mechanical readout which is actuated responsive to the relative effective diameter of the slave pulley and is mounted upon the head of the machine for convenient optical inspection.

One disadvantage of this system design is that the machine operator is required to consult additional references for the precise operating speed for the tool which has been chosen. This allows some margin for operator error which can damage the machine and lead to unacceptable production tolerances in the items which are produced.

In contrast to the prior art, the present invention envisions an automatic selection of the machine speed responsive to the operator selecting the appropriate tool from the tool storage area. In the tool storage area each tool is located adjacent to a tool presence sensor which is actuated upon the removal of the tool for coupling into the spindle or chuck. This tool sensor automatically selects a predetermined speed signal responsive to the tool which has been selected. This predetermined speed signal is communicated to the speed control circuitry which regulates the effective drive diameter of the slave pulley responsive thereto. The electronic assembly includes a circuit for sensing the relative effective diameter of the slave pulley and responsive thereto corrects any spindle speed variations representing deviations from the selected speed interval. This electronic circuitry also provides means for an electronic speed display for the convenience of the operator.

SUMMARY OF THE INVENTION

This invention relates to a system and apparatus for controlling the speed of a variable speed machine tool responsive to the selection of one of a plurality of interchangeable, quick-change tools or tool holders. The control apparatus includes tool storage means for defining a plurality of tool receptacles each of which is adapted for removably storing therein one of the tools. A plurality of tool sensors are provided, with each of the tool sensors paired with and located adjacent to a corresponding one of the tool receptacles for generating a use signal responsive to the removal of the paired one of the tools from the tool receptacle. Speed reference means are provided for generating a speed reference signal representative of the proper speed of each of the tools.

Speed sensor means may also be coupled to the machine tool for sensing the variable speed thereof and generating a speed signal responsive thereto. Comparator means are operably coupled to the speed sensor means, the speed reference means and the tool sensors. The comparator means are activated responsive to receiving the use signal, thereby generating the speed error signals representative of the speed signal being incrementally different from the speed reference signal.

Control means are provided for controlling the speed of the machine tool responsive to the speed error signal. Thereby, the proper speed of the machine tool is automatically selected and continuously controlled following the removal of a selected one of the machine tools from the tool storage means.

BREIF DESCRIPTION OF THE DRAWINGS

Other objects, features and advantages of the present invention will be apparent from a study of the written description and the drawings in which.

DETAILED DESCRIPTION OF THE PREFERRED EMBODIMENT

While the present invention has been designed for use with various types of variable speed machine tools, the first preferred embodiment of the present invention will be described with respect to a Bridgeport vertical milling machine having a Model J-2 variable speed head. The scope of the present invention should not be limited to the design of this machine, since the concept of this invention is applicable to a variety of different machine tools.

Figure 1:
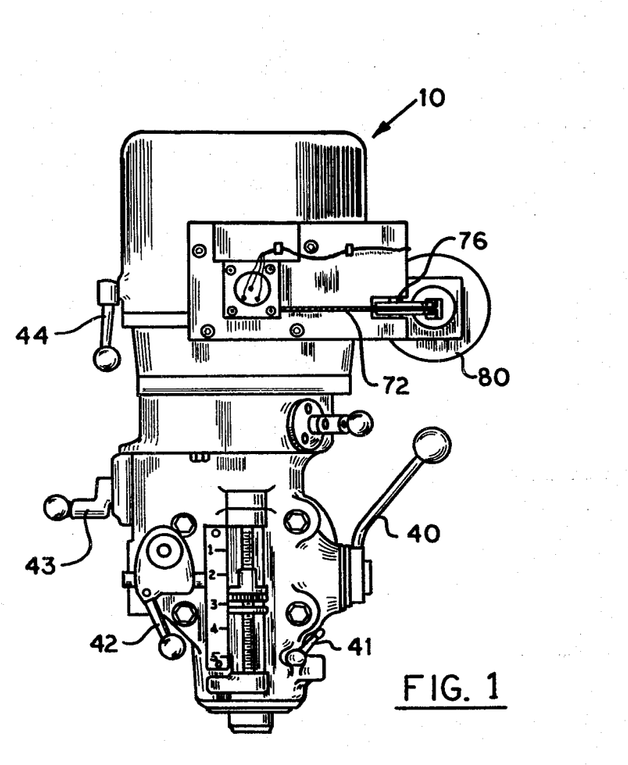
FIG. 1 illustrates a front elevational view of a machine tool having a retrofit speed control apparatus coupled thereto.
Figure 2:
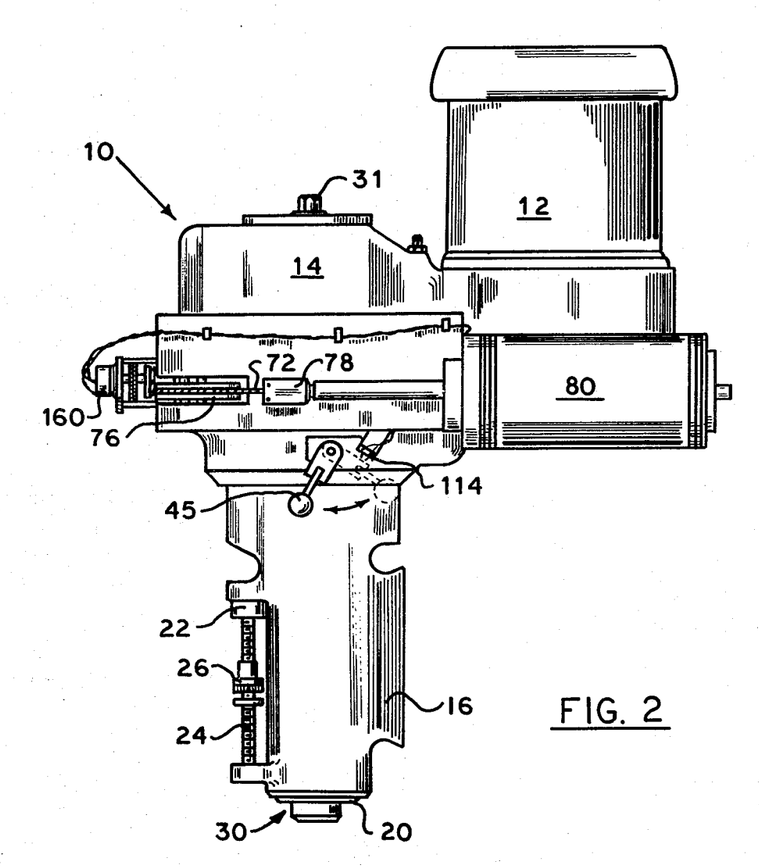
FIG. 2 illustrates a side elevational view of a machine tool having the speed control apparatus coupled thereto.

The vertical milling machine head, shown generally as 10 in FIGS. 1 and 2, includes a constant speed electromechanical motor 12 which is coupled to the rear side of a spindle drive housing 14. The front end of the spindle drive housing 14 has coupled subjacent thereto a spindle head casting 16. A spindle, designated generally as 30, includes a first end 31 which is mounted at the upper section of the spindle drive housing 14. The spindle 30 communicates through the central portion of the spindle head casting 16 and terminates in a quill 20 which provides vertical penetration depth adjustment as the spindle 30 and the tool (not shown) penetrates into the workpiece. A quill-stop 22 is attached to the quill 20 and moves longitudinally along the depth shaft 24 until it communicates with the mechanical limit stops 26 to arrest the penetration of the quill 20 and the rotating tool.

The typical variable speed machine tool head 10 also includes a manual downfeed lever 40 for controlling the depth of penetration of the quill 20 and the rotating tool attached thereto, as well as a quill lock 41, a feed engage lever 42, a feed rate range control 43 and a spindle brake 44.

Figure 3:
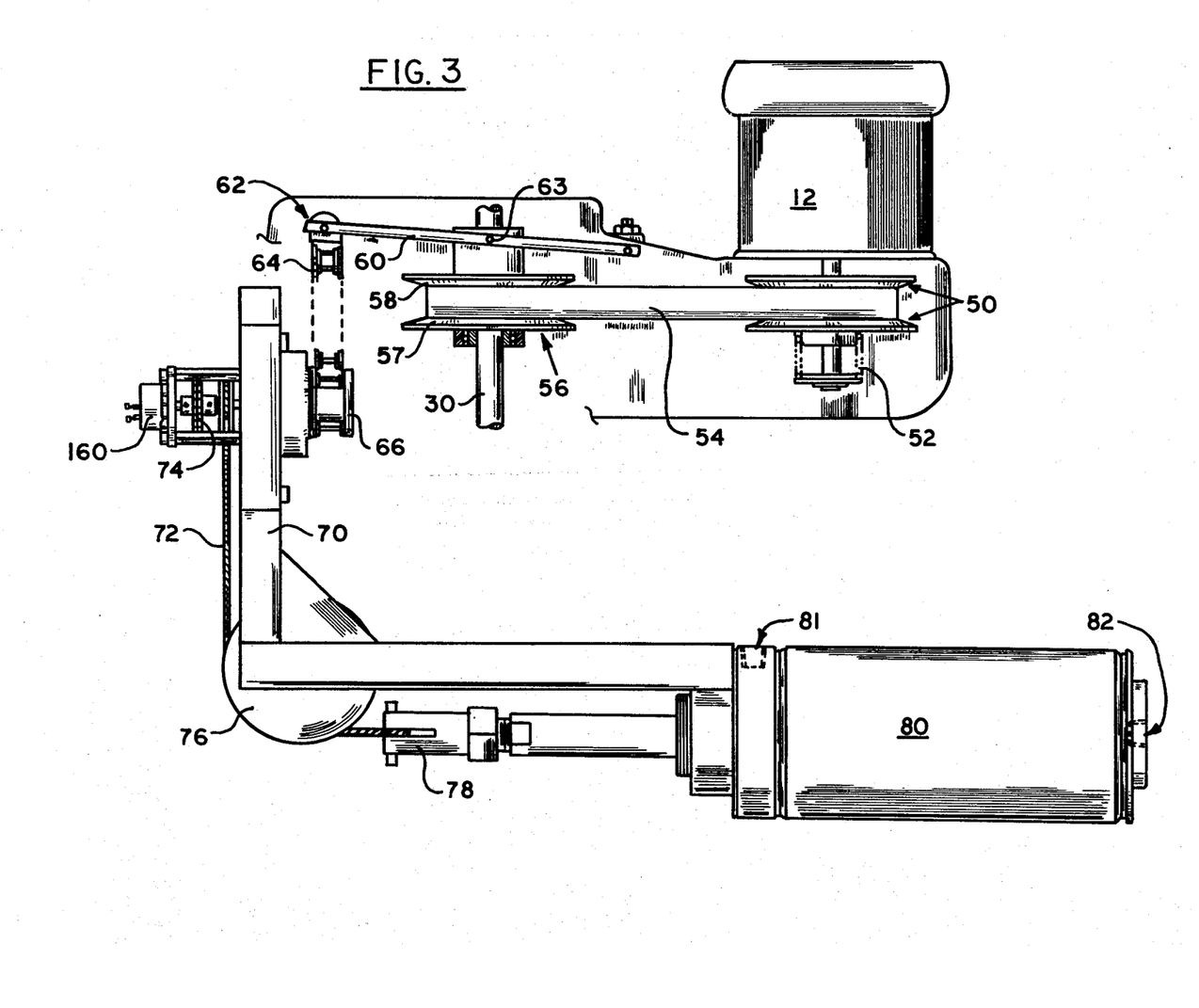
FIG. 3 illustrates a mechanical schematic drawing showing the speed control apparatus for the variable speed machine tool and showing the coupling of the automatic speed control apparatus thereto.

FIG. 3 comprises a cutaway schematic illustration of the operative portions of the variable speed machine tool head 10 as it is retrofitted to and controlled by various elements of the present invention. The rotating shaft of a constant speed electromechanical motor 12 is coupled to the variable diameter drive pulley, shown generally as 50, which comprises an upper and a lower paired beveled surfaces which are mechanically biased toward each other by the operation of the spring control 52. The strength of this biasing force is adjusted so that the paired beveled surfaces are juxtaposed under normal conditions and therefore effect a large diameter drive pulley for rotating a flexible drive belt 54. As the tension on the flexible drive belt 54 is increased, the beveled surfaces comprising the variable diameter drive pulley 50 are separated against the biasing force, thereby reducing the effective diameter of the drive pulley 50.

The opposite loop of the flexible drive belt 54 is operably coupled around a variable diameter slave pulley 56 which has the same general construction as the variable diameter drive pulley 50, except that no integral mechanical biasing force is provided. The variable diameter slave pulley 56 includes a lower beveled communicating surface 57 and an upper beveled communicating surface 58 which are movably coupled to the spindle 30. The upper beveled communicating surface 58 of the slave pulley 56 assembly is movably coupled by a pivot 63 to a speed control lever 60 which has a first end thereof coupled to the spindle drive housing 14 and a second end thereof 62 spaced therefrom. As the second end 62 of the speed control lever 60 is rotated in a downward direction, the relative separation between the upper beveled communicating surface 58 and the lower beveled communicating surface 57 of the variable diameter slave pulley 56 is reduced, thereby increasing the effective diameter of the slave pulley 56, and reducing the effective rotational speed of the spindle 30 coupled thereto. A speed control chain 64 is attached at one end thereof to the second end 62 of the speed control lever 60. A second end of the speed control chain 64 is attached to and wrapped around the circumference of a speed control shaft, shown generally as 66.

It should be noted at this point that the remaining elements as shown in FIG. 3 have actually been rotated by 90 degrees from their positions as shown in FIGS. 1 and 2 in order to more clearly illustrate the functional cooperation between these elements and the variable speed drive assembly which would be normally hidden therebehind in the illustrated view. The speed control shaft 66 communicates through a bearing mounted within the mounting frame 70. A speed control cable 72 is attached to and wrapped around the circumferential surface of another end of the speed control shaft 66. The operative shaft of a speed control feedback potentiometer 160 is attached through a flexible coupling 74 to the adjacent end of the speed control shaft 66 for sensing the relative rotational position thereof.

A second end of a speed control cable 72 is coupled over an idler pulley 76 and terminates in a cable clamp 78 attached to a double acting pneumatic actuator 80 which is mounted to the frame 70. The first end of the speed control cable 72 is wrapped in the opposite rotational sense about the speed control shaft 66 as compared to the coupling of the speed control chain 64 thereto. In this manner when the double acting pneumatic actuator 60 retracts the speed control cable 72, the speed control shaft 66 is rotated in the proper direction to coil the end of the speed control chain 64 about the speed control shaft 66. This coiling of the speed control chain 64 causes the second end 62 of the speed control lever 60 to be rotated in a downward direction, thereby causing the effective diameter of the slave pulley 56 to be increased.

The double acting pneumatic actuator 80 includes a first air line 81 and a second air line 82 coupled thereto for controlling the relative position of the internal piston, which is coupled by a rod to the cable clamp 78. The internal piston is moved longitudinally through the double acting pneumatic actuator 80 by the controlled application of air pressure through the corresponding pneumatic lines 81 and 82.

Figure 4:
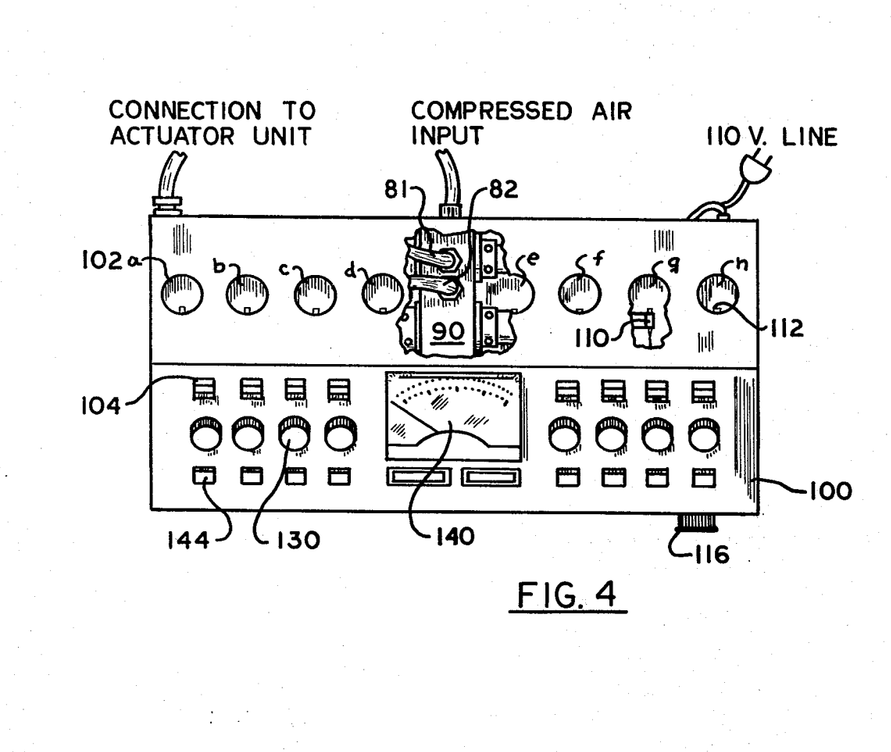
FIG. 4 is a top elevational view of the tool storage means in accordance with the teachings of the present invention.
Figure 5:
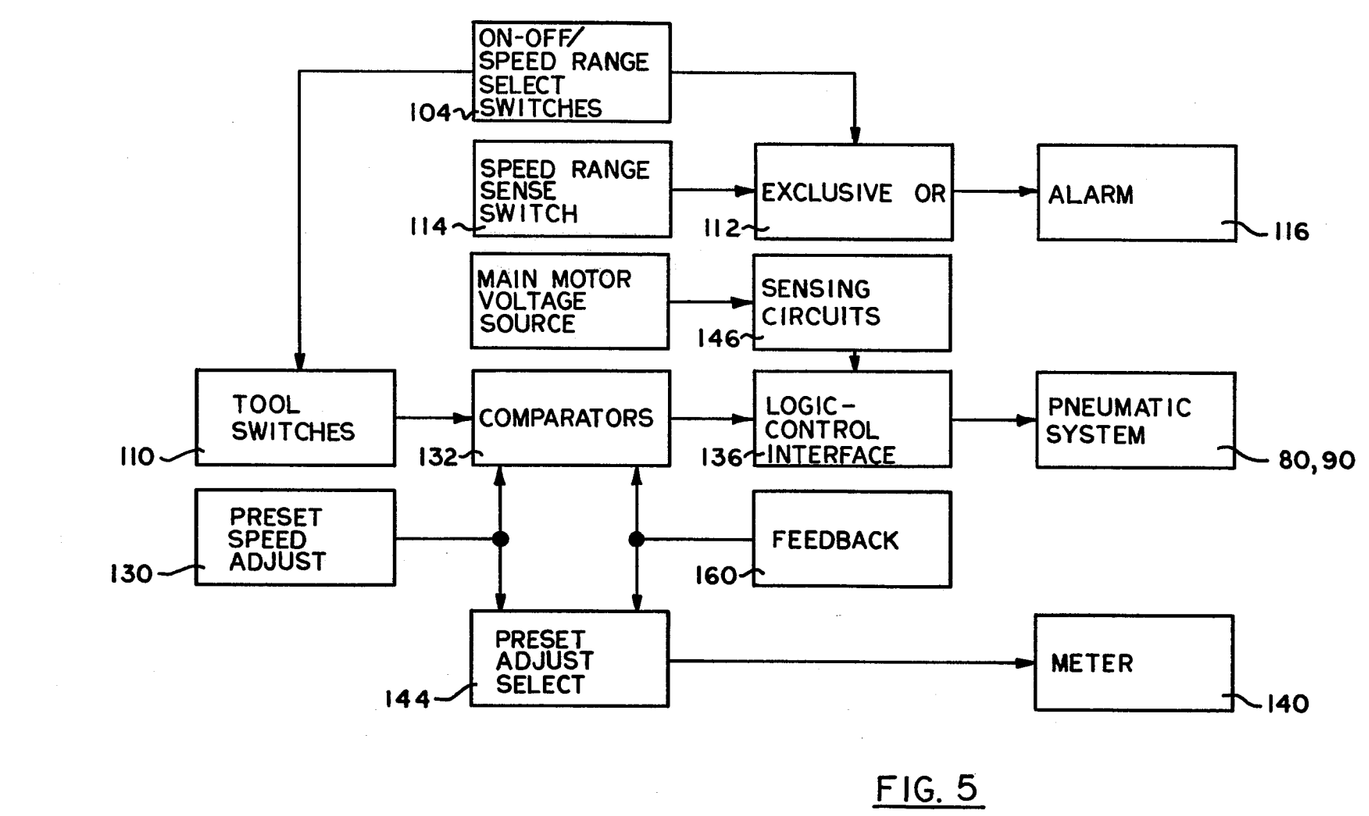
FIG. 5 is a schematic block diagram in accordance with the teachings of the present invention.
Figure 6:
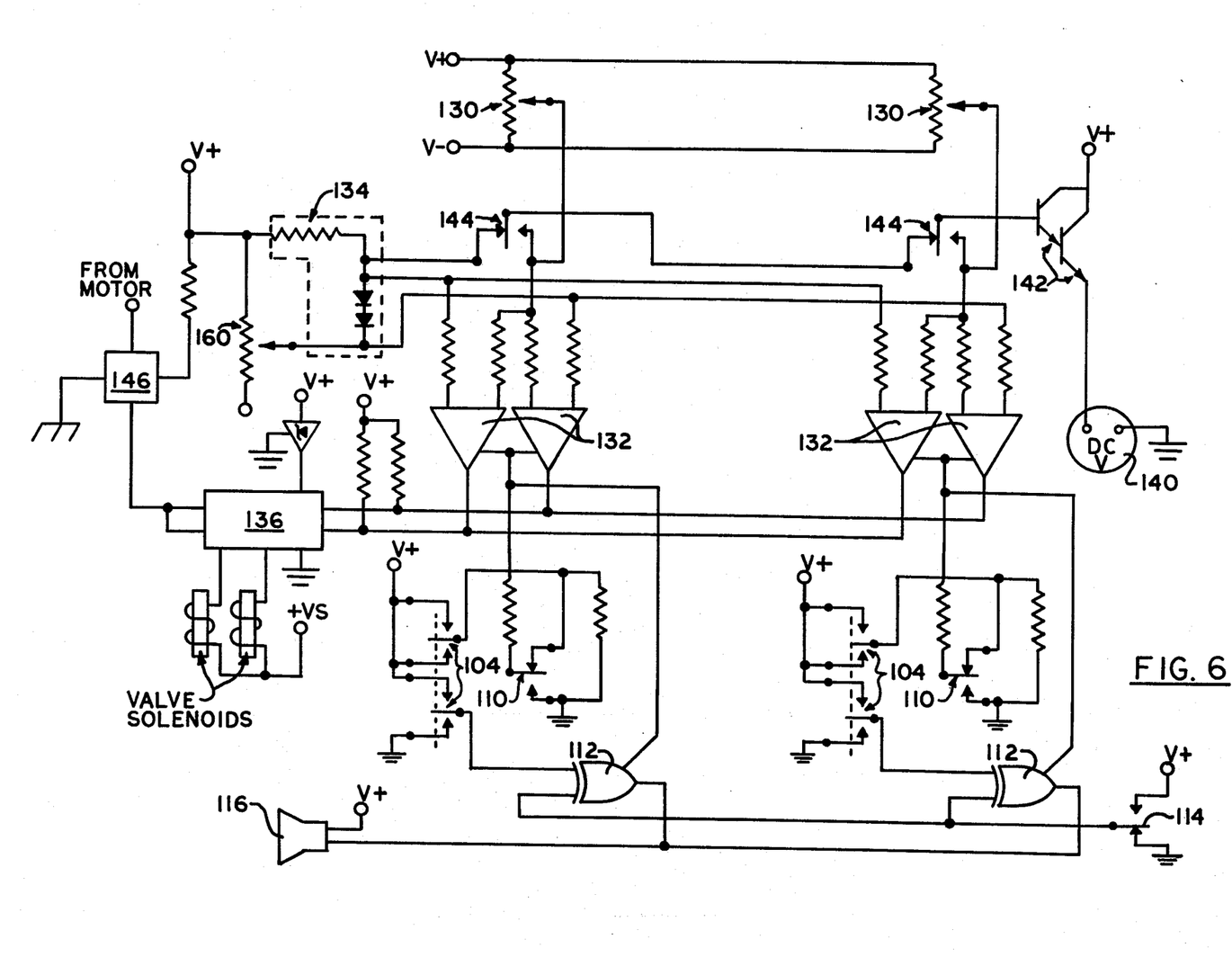
FIG. 6 illustrates an electrical schematic diagram of the electronic components in accordance with the teachings of the present invention.

The pneumatic lines 81 and 82 are coupled at the opposite ends thereof to an electromechanical pneumatic valve, shown generally as 90 in FIGS. 4, 5 and 6. This pneumatic valve 90 is a 3-position, 4-way valve which causes the piston within the actuator 80 to be driven in the forward or the reverse direction depending upon the polarity of the compressed air fed thereto. The pneumatic valve 90 also includes a center "OFF" position during which time all ports are closed for trapping the air in the cylinder, thereby maintaining the quiescent or ambiant position of the actuator 80 against any biasing forces which may be incident thereupon. The electronic circuitry used to control the pneumatic valve 90 will be subsequently described with regard to the electronic subsystems of the present invention.

Figure 7:
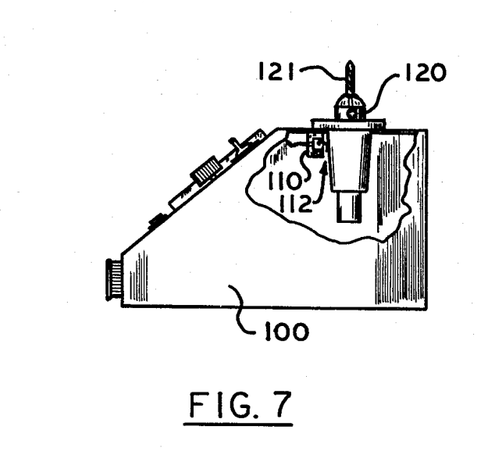
FIG. 7 illustrates a side elevation of the tool storage means in accordance with the present invention.

The pneumatic valve 90 is physically mounted within a control console tool rack, shown generally as 100 in FIGS. 4 and 7. The control console 100 includes in a top surface thereof a plurality of aperatures 102 (*a* through *h*) each specifically designed and sized to receive therein a paired one of the quick change tool holders, shown generally as 120 in FIG. 7. The quick change tool holder 120 includes a main body section having at one end thereof a receptacle for receiving a typical tool 121 and having at an opposite end thereof a mating surface designed to be inserted within the spindle quill assembly 20. When the quick change tool holder 120 is inserted within the proper aperture 102 within the control console 100, the mating surface of the quick change tool holder 120 makes mechanical contact with a sensing lever 112 which mechanically actuates a tool sensing switch 110. As illustrated in FIG. 6, the tool sensing switch 110 comprises typically a single pole double throw switch actuated by a sensing lever 112. When the sensing lever 112 is depressed, indicating that the mating surface of the quick change tool holder 120 has been inserted within the control console 100, the sensing switch 110 will be activated, thereby allowing current to flow therethrough.

With continuing reference to FIGS. 4 and 6, the control console 100 also includes thereon a plurality of speed range select switches 104 (a–h) which comprise double-pole double-throw switches. In a first position each of these switches indicates that a high speed range should be selected by the operator. In a second position the switch indicates that a low speed range should be selected by the operator. In a third or middle-off position the switch 104 indicates that the corresponding one of the tool apertures 102 is intended to be vacant. In each of these positions an exclusive OR-gate 112 compares the appropriate signal from the speed range select switch 114 which is physically mounted adjacent to and coupled with the speed range select lever 45, as shown in FIG. 2. Therefore, when the signal transmitted through the speed range select switch 104 is the same as the signal transmitted through the speed range sense switch 114, the appropriate paired one of the exclusive OR-gates 112 will not be actuated. However, when the desired speed range, as selected by the speed range select switch 104, differs from the actual speed range select lever and the corresponding speed range sense switch 114, the exclusive OR-gate 112 will be actuated, thereby energizing the speed range alarm 116, as shown in FIG. 6. This alarm is intended to alert the machine operator that the speed range select lever 45 should be manually adjusted to the proper speed position.

With continuing reference to FIGS. 4 and 6, a plurality of pre-settable speed adjustment potentiometers 130 (a–h) are included for allowing the operator to adjust the desired rotational speed of the spindle assembly. In the normal mode of operation the pre-settable speed adjustment potentiometer 130 generates a voltage which is compared by the comparator pair 132 to feedback voltages representative of the effective diameter of the variable diameter slave pulley 56. A first feedback voltage is generated from the speed control feedback potentiometer 160 representative of the angular rotational position of the speed control shaft 66. An alternate embodiment of the present invention would utilize a tachometer coupled to the spindle assembly for sensing the speed thereof and generating the first feedback voltage responsive thereto. This first feedback voltage is then fed into an interval generating circuit 134 which generates an upper limit feedback voltage which is incrementally offset from the first feedback voltage generated by the operation of the speed control feedback potentiometer 160. The first feedback voltage and the upper limit feedback voltage are then compared to the pre-set speed adjustment voltage from the pre-set adjustment potentiometer 130.

When the output voltage from the pre-set speed adjust potentiometer 130 is compared by the comparator pair 132, the output voltages from the comparator pair will indicate the desired condition whereby the pre-set speed adjust voltage will be bracketed by the upper limit feedback voltage level and the first feedback voltage level. If this condition exists, then the output of the comparator pair 132 will be balanced, thereby indicating to the logic control interface of the pneumatic subsystem 136 that the double acting pneumatic actuator 80 should be retained in the static or quiescent condition. However, once the pre-set speed voltage from the pre-settable speed adjustment potentiometer 130 deviates outside of the allowable interval, the output of the comparator pair 132 becomes unbalanced. The precise polarity of this unbalance indicates to the logic control interface circuitry 136 the direction in which the double-acting pneumatic actuator 80 must be energized in order to correct for the speed error.

A Darlington transistor pair 142 is included for sensing the upper voltage limit derived from the interval generating circuit 134 representative of the feedback voltage, and generating responsive thereto a tracking voltage for driving the speed display meter 140. This speed display meter 140 indicates the relative effective diameter and therefore the relative effective speed of rotation of the spindle 30.

A plurality of pre-set adjustment switches 144 (a–h) are mounted to the front panel of the control console 100. By actuating the appropriate switch the machine operator may substitute the pre-set speed adjustment potentiometer 130 for display upon the speed display meter 140 in order that the precise new speed may be pre-set into the system.

With continuing reference to FIG. 6, an enabling circuit 146 is provided for sensing that power has been applied to the motor 12, and responsive thereto the circuit 146 generates an enable signal which is transmitted to the logic control interface circuitry 136. In this manner, the double-acting pneumatic actuator 80 will only be enabled when the motor 12 is receiving power and rotating the spindle 30. This enabling circuit 146 is required to effect the proper operation of the variable diameter slave pulley 56 which only operates properly when rotating.

It will be understood that additional sections of the aforementioned circuitry will be required for each of the tool sensing switches 110 which are provided for sensing the presence or absence of the corresponding quick change tool holders within the appropriate apertures 102 (a–h).

The operation of the machine tool speed control system in accordance with the present invention will now be described with reference to FIG. 5. The operator must first initialize and pre-set all of the pre-set speed adjustments as follows. Each of the tools is sequentially removed from its corresponding aperture 102 (a–h), thereby actuating the corresponding one of the tool sensing switches 110 (a–h). If the corresponding speed range select switch 104 is in the same speed range as the speed range sense switch 114, then the exclusive OR gate 112 will not activate the alarm 116. However, if these speed ranges do not correspond, the exclusive OR gate 112 will actuate the alarm 116 in order to alert the operator that the speed range must be adjusted.

Next, the pre-set adjust select switch 144 is switched to the meter position, and the corresponding one of the pre-set speed adjustments 130 is varied until the required spindle speed is registered on the meter 140. The pre-set adjust select switch 144 is then returned to the operate position.

During the actual operation of the machine tool speed control system, the removal of the tool or tool holder from the corresponding aperture 102 (a–h) will actuate the corresponding one of the tool sensing switches (a–h), thereby enabling the corresponding one of the comparators 132. The first feedback voltage from the feedback potentiometer 160, together with the upper limit feedback voltage generated by the interval circuit 134, will then be fed to the appropriate comparator 132 and compared with the pre-set speed adjustment voltage from the pre-set adjustment potentiometers 130. The resultant error signal from the appropriate comparator 132 will then activate the logic control interface circuitry 136 only if the voltage is supplied to the main motor and sensed by the sensing circuits 146 for actuating the logic control interface 136. The error signal from the logic control interface 136 is then fed to the pneumatic valve 90 for controlling the position of the pneumatic actuator 80, which in turn controls the effective diameter of the slave pulley 56 for varying the effective drive speed of the spindle assembly.

While the first preferred embodiment of the present invention has been described as a retrofit system for being coupled to existing machine tools, it will be apparent to one skilled in the art that further modification of the present invention could be effected to integrate the present concept into the total machine tool system. It is also envisioned that electronic equivalents of the pneumatic control system described herein may be included within the control system without departing from the spirit and scope of the present invention.

The first preferred embodiment of the retrofit speed control system for machine tools has been described as an example of the invention as claimed. However, the present invention should not be limited in its application to the details and constructions illustrated in the accompanying drawings of the specification, since this invention may be practiced or constructed in a variety of other different embodiments. Also, it must be understood that the terminology and descriptions employed herein are used solely for the purpose of describing the general system and the preferred embodiment thereof, and therefore should not be construed as limitations on the invention or its operability.

I claim:

1. A speed control system for being coupled to a variable speed machine tool in order to control the speed of the machine tool responsive to the manual selection of one of a plurality of interchangeable quick-change tools, said control apparatus comprising in combination:
    tool storage means including a plurality of tool receptacles each for removably storing therein one of the tools;
    a plurality of tool sensors, each paired with and located adjacent to one of said tool receptacles, for generating a use signal responsive to the manual removal of the paired one of the tools from said tool receptacle;
    speed reference means for generating a plurality of speed reference signals representative of the proper speed for each of the machine tools;
    speed sensor means coupled to the machine tool for generating a speed signal representative of the speed of the machine tool, with said speed sensor means further including interval generator means for receiving said speed signal and responsive thereto generating a dynamic limit speed signal, whereby an operational limit window is defined between said speed signal and said limit speed signal;
    comparator means for generating a speed error signal representative of said speed signal being incrementally different from said speed reference signal, with said comparator means comprising in combination:
        a first speed comparator having a first input operably coupled to said speed reference means and a second input operably coupled to said speed sensor means, with said first speed comparator generating a first one of said speed error signals responsive to said speed reference signal being greater than said speed limit signal;
        a second speed comparator having a first input operably coupled to said interval generator means, with said speed second comparator generating a second one of said speed error signals responsive to said speed reference signal being less than said speed limit signal;
        logic means operably coupled to said first speed comparator and to said second speed comparator for generating at an output thereof said speed error signal responsive to receiving one of said first speed error signal and said second speed error signal; and
    means for controlling the speed of the machine tool responsive to said speed error signal, whereby the proper speed of the machine tool is automatically selected following the manual removal of a selected one of the tools from said tool storage means.

2. The machine tool speed control apparatus as described in claim 1 wherein the machine tool includes a variable speed drive system employing a pulley of variable effective diameter; and wherein
    said speed sensor means comprises means for sensing the diameter of the variable diameter pulley and generating said speed signal responsive thereto.

3. The machine tool speed control apparatus as described in claim 1 wherein said means for controlling the speed of the machine tools comprises in combination:
    an electromechanical-pneumatic valve for controlling, responsive to said speed error signal, the flow of a gas under pressure at outputs thereof; and
    a pneumatic actuator having positional output means coupled to the variable diameter pulley for controlling the effective diameter thereof, with said pneumatic actuator having inputs thereof operably coupled to said outputs of said electromechanical-pneumatic valve for controlling the position of said output means, whereby the effective diameter of the variable diameter pulley is pneumatically controlled responsive to said speed error signal.

4. A speed control system for being coupled to a variable speed machine tool in order to control the speed thereof responsive to the manual selection of one of a plurality of interchangeable quick-change tools, said control apparatus comprising in combination:
    tool storage means including a plurality of tool receptacles each for removably storing therein one of the tools;
    a plurality of tool sensors, each paired with and located adjacent to one of said tool receptacles, for generating a use signal responsive to the manual removal of the paired one of the tools from said tool receptacle;

speed reference means for generating a plurality of speed reference signals representative of the proper speed for each of the machine tools;

speed sensor means coupled to the machine tool for generating a speed signal representative of the speed of the machine tool, said speed sensor means having dynamic limit means for generating at an output of said speed sensor means a dynamic upper speed limit signal and a dynamic lower speed limit signal, whereby a dynamic limit window is defined around said speed signal;

a first speed comparator having a first input operably coupled to said speed reference means and the second input operably coupled to said speed sensor means, with said first speed comparator generating a first one of said speed error signals responsive to said speed reference signal being greater than said dynamic upper speed limit signal;

a second speed comparator having a first input operably coupled to said speed reference means and a second input operably coupled to said speed sensor means, with said second speed comparator generating a second one of said speed error signals responsive to said speed reference signal being less than said dynamic lower speed limit signal;

logic means operably coupled to said first comparator and to said second comparator for generating at an output thereof said speed error signal responsive to receiving either said first speed error signal or said second speed error signal; and means for controlling the speed of the machine tool responsive to said speed error signal, whereby the proper speed of the machine tool is automatically selected following the manual removal of a selected one of the machine tools from said tool storage means and dynamically regulated so as to remain within the operational speed limit window.

* * * * *